(12) United States Patent
Dybus

(10) Patent No.: US 7,797,186 B2
(45) Date of Patent: Sep. 14, 2010

(54) METHOD AND SYSTEM FOR GATHERING AND RECORDING REAL-TIME MARKET SURVEY AND OTHER DATA FROM RADIO LISTENERS AND TELEVISION VIEWERS UTILIZING TELEPHONES INCLUDING WIRELESS CELL PHONES

(76) Inventor: Donnelly Andrew Dybus, c/o RadioStat, LLC, 9429 N. 47th St., Phoenix, AZ (US) 85028

( * ) Notice: Subject to any disclaimer, the term of this patent is extended or adjusted under 35 U.S.C. 154(b) by 1023 days.

(21) Appl. No.: 11/526,972

(22) Filed: Sep. 26, 2006

(65) Prior Publication Data

US 2007/0107008 A1  May 10, 2007

Related U.S. Application Data

(60) Provisional application No. 60/727,905, filed on Oct. 18, 2005.

(51) Int. Cl.
*G06F 17/00* (2006.01)
(52) U.S. Cl. ............... 705/10; 702/189; 705/14; 709/205; 709/224; 340/540; 463/40; 725/10; 725/12; 725/13; 725/14
(58) Field of Classification Search .............. 705/10
See application file for complete search history.

(56) References Cited

U.S. PATENT DOCUMENTS

| | | | | |
|---|---|---|---|---|
| 4,912,466 A | * | 3/1990 | Call | 341/20 |
| 5,023,929 A | * | 6/1991 | Call | 725/14 |
| 5,483,276 A | * | 1/1996 | Brooks et al. | 725/10 |
| 5,579,124 A | * | 11/1996 | Aijala et al. | 386/96 |
| 7,222,071 B2 | * | 5/2007 | Neuhauser et al. | 704/231 |
| 7,239,981 B2 | * | 7/2007 | Kolessar et al. | 702/189 |
| 7,257,536 B1 | * | 8/2007 | Finley et al. | 704/270 |
| 7,272,982 B2 | * | 9/2007 | Neuhauser et al. | 73/865.9 |

(Continued)

FOREIGN PATENT DOCUMENTS

FR   2715016 A1 *  7/1995

(Continued)

OTHER PUBLICATIONS

The Portable People Meter System, Arbitron.com, Jun. 8, 2004, retrieved from web.archive.org, p. 1-5.*

(Continued)

*Primary Examiner*—Beth V Boswell
*Assistant Examiner*—Justin M Pats

(57) ABSTRACT

The invention records real-time radio and television listener data utilizing automated, interactive questions and radio and television broadcast audio segments recorded by telephone, including wireless cell phones. Telephone users are asked to hold their phone in the direction of any broadcast audio they are hearing or listening to. Streaming program audio directly from radio and television broadcasts is matched to the program audio recorded from telephone users using computer audio matching technology. When an audio match is made, recorded data will automatically populate an alpha/numeric database creating a record including fields for identifying the radio or TV station, time of recording, the phone user's 10 digit telephone number and demographic information on the listener. Demographics may be obtained prior to the call or by automated interactive questioning, during a call, with the phone user responding to questions verbally or by pushing appropriate keys on the telephone keypad.

7 Claims, 1 Drawing Sheet

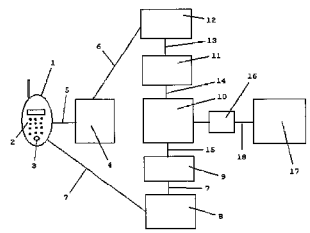

(1) Telephone
(2) Keypad
(3) Microphone
(4) Radio / Television Set
(5) Radio / Television Broadcast Audio
(6) Radio / television program signal tuned in by the Radio / Television set
(7) Telephone Transmissions
(8) Telephone Companies
(9) Call Center
(10) Computer Control Center
(11) Receiver
(12) Radio / Television Stations
(13) Multiple Radio Television Signals
(14) Radio / Television Streaming Program Audio
(15) Recorded Audio Segments and Data
(16) Database
(17) Data End-Users
(18) Internet or Other Means of Data Transmission

U.S. PATENT DOCUMENTS

| | | | |
|---|---|---|---|
| 7,316,025 B1 * | 1/2008 | Aijala et al. | 725/18 |
| 7,408,460 B2 * | 8/2008 | Crystal et al. | 340/540 |
| 7,443,292 B2 * | 10/2008 | Jensen et al. | 340/540 |
| 7,463,144 B2 * | 12/2008 | Crystal et al. | 340/540 |
| 7,483,975 B2 * | 1/2009 | Kolessar et al. | 709/224 |
| 7,592,908 B2 * | 9/2009 | Zhang et al. | 340/539.13 |
| 7,623,823 B2 * | 11/2009 | Zito et al. | 455/2.01 |
| 7,640,141 B2 * | 12/2009 | Kolessar et al. | 702/189 |
| 7,650,793 B2 * | 1/2010 | Jensen et al. | 73/800 |
| 7,739,140 B2 * | 6/2010 | Vinson et al. | 705/10 |
| 2001/0003099 A1 * | 6/2001 | Von Kohorn | 463/40 |
| 2005/0234774 A1 * | 10/2005 | Dupree | 705/14 |

FOREIGN PATENT DOCUMENTS

WO     WO 03077455 A1 *   9/2003

OTHER PUBLICATIONS

IMMI Overview, Integrated Media Measurement Incorporated, Apr. 11, 2006, retrieved from web.archive.org, p. 1-7.*

Major advertiser backs Wireless Group in ratings Battle, CNF, Mar. 30, 2004, p. 1-2.*

* cited by examiner

FIGURE 1

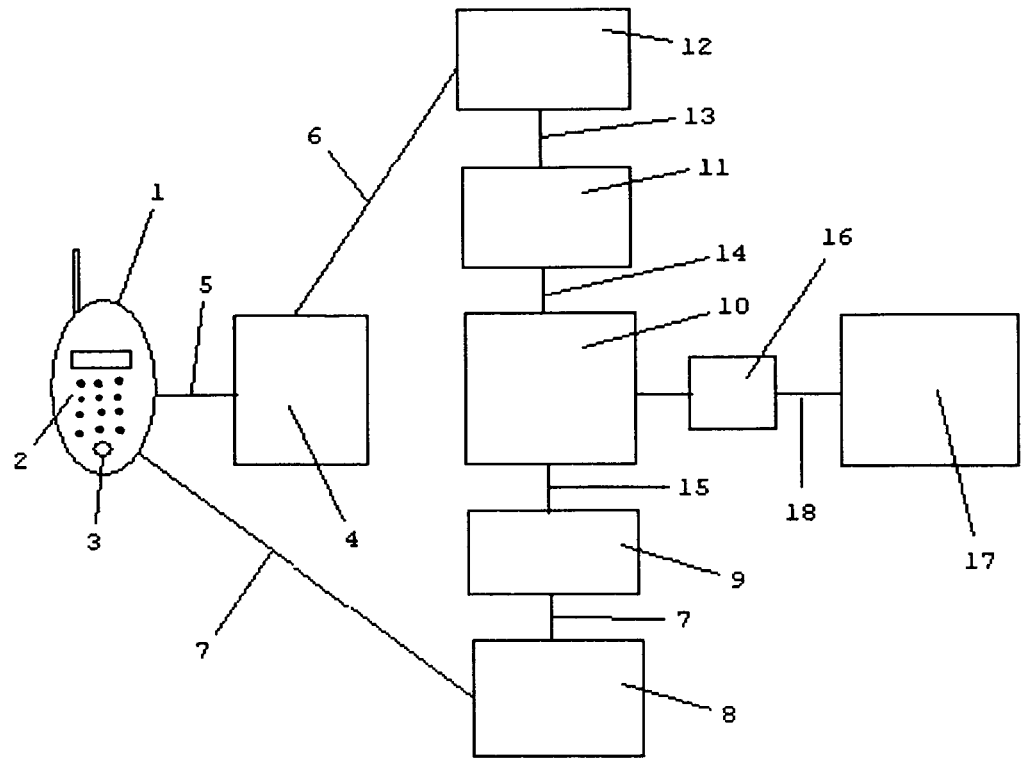

(1) Telephone
(2) Keypad
(3) Microphone
(4) Radio / Television Set
(5) Radio / Television Broadcast Audio
(6) Radio / television program signal tuned in by the Radio / Television set
(7) Telephone Transmissions
(8) Telephone Companies
(9) Call Center
(10) Computer Control Center
(11) Receiver
(12) Radio / Television Stations
(13) Multiple Radio Television Signals
(14) Radio / Television Streaming Program Audio
(15) Recorded Audio Segments and Data
(16) Database
(17) Data End-Users
(18) Internet or Other Means of Data Transmission

METHOD AND SYSTEM FOR GATHERING AND RECORDING REAL-TIME MARKET SURVEY AND OTHER DATA FROM RADIO LISTENERS AND TELEVISION VIEWERS UTILIZING TELEPHONES INCLUDING WIRELESS CELL PHONES

RELATED APPLICATIONS

The present application is associated with U.S. provisional patent application Ser. No. 60/727,905, filed Oct. 18, 2005, by Donnelly Andrew Dybus. Said United States provisional patent application is included herein by this reference and the benefit of the priority date of said United States provisional patent application is hereby claimed.

FIELD OF THE INVENTION

The present invention (the "invention") relates to the gathering, recording and analysis on a real time basis and the dissemination of accurate, comprehensive, verifiable, market survey data and other information from radio listeners and television viewers including said listeners' and viewers' radio and television broadcast station and programming preferences, listening and viewing habits and attitudes, demographic and other information utilizing ordinary telephones, including wireless cell phones, to receive and record said market survey data and other information, including radio and television broadcast program audio segments actually being listed to or heard by each said radio listener and television viewer called and utilizing current and future computer automated, interactive telephony, audio matching, tone frequency identification, audible and subaudible signal detection and decoding, voice recognition, Internet, computer software and database technologies.

BACKGROUND OF THE INVENTION

In today's competitive business environment, it is a fundamental business principle that to be successful, advertisers, marketers, and business concerns must determine the likes and dislikes of the general public. It is especially crucial in today's global, highly competitive marketplace that businesses have timely and accurate information regarding the public's preferences and especially the public's reaction to a business' products and services. Consumer market research is a multi-billion dollar industry in America.

This fundamental business principle is greatly amplified in the radio and television broadcasting and advertising industries. The life-blood of commercial radio and television broadcast stations is advertising revenues. And, success of advertisers and advertising agencies depends in large part on their ability to target their advertising messages to as large an interested audience as possible without breaking their advertising budgets. Therefore, in the advertising and radio and television business worlds, determining timely and accurate demographics and program preferences of listeners and viewers is essential to running successful advertising and broadcasting businesses.

There are currently a few large companies that gather radio listener and television viewer market survey data and other information, rank radio and television broadcast stations based on listenership or viewership share in a particular broadcast market and sell the said market survey data and other information to radio and television broadcast companies, advertisers, advertising agencies and others. This business or industry is often referred to as the radio or television "ratings" business. Arbitron, Inc. of New York, N.Y. ("Arbitron") dominates the radio ratings industry. Neilsen Media Research, also located in New York, N.Y., dominates the television ratings business. "Markets" are generally expressed in geographic terms and it is not unusual for a radio or television broadcast station to be in more than one "market" at a time.

Having accurate and timely market survey data and information and using said data to predict how many people are expected to be listening to a particular radio or television station, at a particular time and to particular programming and said listeners' demographics (i.e., their ages, gender, ethnicity, occupations, etc.) bear directly on the types of advertisers, advertising content and the price an advertiser is willing to pay for a particular advertising "spot" during program airing on a particular radio or television broadcast station. This dynamic, of course, impacts the amount a radio and television broadcast company can reasonably expect to charge advertisers for particular advertising spots and, in turn, the amount of advertising revenues said radio and television broadcast company can expect to make. These numbers can be vastly different depending on the facts. For example, during the NFL Super Bowl broadcast in recent years, the television network carrying the Super Bowl game charged millions of dollars a minute for air time for advertisers. On the other hand, a low power, independent radio station in rural America with a few thousand listeners might get fifty dollars for airing a one minute commercial spot.

The radio and television "ratings" business has an enormous impact on radio and television broadcast companies, large and small. Poor "ratings" (i.e., low listenership or viewership compared to other radio and television broadcast stations in a particular market, as determined by a ratings company like Arbitron) for its programming may actually put a radio or television station out of business, as again, advertising revenues for commercial broadcast stations are their lifeblood and are tied to these "ratings. As such, the timeliness, accuracy and reliability of listenership, viewership and demographic data are of super-critical importance to radio and television broadcasters and their advertiser-customers.

Especially large, corporate broadcast companies like Clear Channel Communications, Inc. of San Antonio, Tex., which owns hundreds of radio and television stations across America, have complained publicly and bitterly for many years about the highly untimely (i.e., quarterly reports) and inaccurate data and the exorbitant cost of obtaining radio listener data from Arbitron. Arbitron is currently the leading radio monitoring company (essentially a de facto monopoly) which offers a radio listener statistical gathering and reporting service (i.e., a radio station ratings service).

Advertising executives who advertise on radio have lately exerted a significant amount of energy searching for a more timely, more accurate and more detailed information source to guide their marketing investments, which investments amount to many billions of dollars in expenditures each year to radio and television broadcasters.

Radio and television station owners and executives are in the same search for better information to guide their programming and on-air talent scheduling decisions. Generally speaking, the more people who listen to and view a particular radio or television station's programming, the bigger the piece of the advertising dollar pie in its market said radio or television station will receive. Advertisers and advertising agencies carefully review data on the number of listeners and their demographics of individual radio and television stations and their programming and make decisions based on this data on where and when to place their advertising dollars.

An automated, interactive system that comprehensively monitors radio and television broadcasts in each radio and television broadcast market and determines in a timely, verifiable, statistically significant and accurate manner (i) the relative levels of listenership and viewership of each radio and television station in said markets on a real-time basis, (ii) whether someone is actually listening to or viewing a radio or television broadcast and (iii) also gathers demographic and other useful information and data from radio listeners and television viewers on a real time basis, has not previously existed. The invention changes all that.

Nor has a system existed prior to the invention that utilizes ordinary, unmodified telephones, including wireless cell phones as a receiving and recording device for data on said radio listenership and television viewership and demographics, as does the invention.

As discussed further herein below, others who recognize the current severe shortcomings in the radio and television ratings business, including Arbitron, itself, have set out on a course to invent new ways to capture radio listenership and television viewership data and habits with expensive, custom designed and specially manufactured electronic devices, which in all cases but one we are aware of, have no other useful function but to monitor radio or television signals. The proponents of some of these devices expect them to be worn or carried around by radio listeners, despite having no other useful purpose.

The expense to develop, test and mass produce said specialized electronic devices and other signal encoding equipment that must be employed under some proposals by radio and television broadcast stations for said specialized electronic devices to work, will increase the expense of obtaining ratings data by end-users, exponentially.

Utilizing unmodified, ordinary telephones, including ubiquitous, wireless cell phones, as the invention does, to capture needed data will save radio and television companies and advertisers millions of dollars in the capital investment, operations and research expenses that would otherwise be needed to develop, test and mass produce said specialized electronic devices. These expenses are passed along to said radio and television broadcast companies and advertisers in the fees they are charged for ratings data.

Unlike the invention, and despite the great expense of other proposals that use specialized electronic devices, none of said specialized electronic devices can detect whether or not a radio listener or television viewer is actually listening to radio or viewing television programming that is detected by said specialized electronic device. And, if a radio listener or television viewer actually is listening to or viewing said detected radio and television programming, said specialized electronic devices are unable to determine and the duration of said radio listening and television viewing.

Unlike the invention, and despite the great expense of other proposals that use specialized electronic devices, none of said specialized electronic devices can detect demographic information such as the age, gender, ethnicity, occupation, etc., of the actual radio listeners and television viewers whose radio listening and television viewing activities are purportedly captured by said specialized electronic devices.

The vast majority of Americans over 12 years of age carry wireless cell phones wherever they go, including in the car, to work, to school, on vacation and even on the beach. Today, wireless cell phones double as personal data assistants (PDAs), digital cameras, recorders, music players, video players, Internet access, email and text messaging devices, etc. Wireless cell phones have become indispensable for all age groups, albeit for difference reasons. Human behavior dictates that specialized electronic devices, with no other useful purpose or function, will be left at home in a drawer.

Therefore, given the above described state of affairs in the radio and television ratings industry, and the serious shortcomings of other current and proposed systems and proposals, as described in further detail herein below, what is needed in is a more affordable, real-time system for obtaining, monitoring, recording, verifying and reporting radio listener and television viewer programming preferences, demographic data on said radio listeners and television viewers, and other information and data useful and necessary to the radio and television broadcast and advertising industries and others. The invention does all of this.

Arbitron currently "rates" radio broadcasts based on the listening audience (i.e., number of listeners) tuned into a particular radio station and releases this data on a quarterly basis. This rating, unlike ratings services for television broadcast done by Nielsen Media Research, Inc. of New York, N.Y., is not done in real time. Over the past fifty years, the conventional (Arbitron) method of providing these statistics is from a network of paper diaries maintained by thousands of listeners in certain radio markets across the United States.

More specifically, the current Arbitron process collects paper questionnaires via a purportedly random sampling of listeners in a radio broadcast market. Thus, for a given market, a certain percentage of the population is randomly selected and called. The calls are purportedly generated by random telephone number dialing. Those persons who are contacted via the telephone are then asked if they are willing to participate in the Arbitron diary process. If the person agrees, Arbitron then sends that person a paper diary. The diary consists of three types of questions: (1) What did you listen to? (2) When did you listen to it? (3) Where were you when you listened to it? The participants are asked to collect this information and write it down in the provided diary over a seven-day period. At the end of that seven-day period, the diary is supposed to be sent back to Arbitron. This process is repeated until Arbitron determines a statistically relevant number of diaries have been collected in the given market.

Many in the radio industry view the Arbitron paper system as outdated and inadequate. This is because this system's output lacks depth and has a many months-long lag time for generating reports. The Arbitron paper process is also vulnerable to bias and fraud. That is, if a participant prefers a specific station, they (intentionally or unintentionally) may fill the diary in a way that favors that particularly radio station. Further, if a person with fraudulent intentions obtains one or more diaries and skews them towards a particular station, this compromises the statistical integrity of the process. Despite these current limitations, radio broadcasters and other subscribers for listener statistics continue to use the flawed Arbitron system because alternative rating services are not available.

In an attempt to overcome the above-described shortcomings, Arbitron has recently developed and is currently testing a "Portable People Meter" (PPM) system. The PPM is a pager-sized device that is worn or carried by survey participants throughout the day to collect radio listening statistics. The PPM, however, still faces several shortcomings such as lack of in-depth information recorded, contaminated data due to stray broadcast signals, expense of installing PPM signal embedding devices in multiple broadcast points, the inability to distinguish between those listening and those merely hearing a broadcast and skewed data due to unsightly visual presence of the PPM device on survey participants. Another shortcoming is that the PPM system's statistical integrity depends on survey participants actually wearing, activating, and periodically returning the PPM device to a base cradle to upload its stored information and re-charge its batteries. To date, the PPM system has not been embraced by the radio and advertising industries, including for reasons stated herein below.

Further, apparatus to monitor the identity of a selected radio station within a vehicle are known to exist. These apparatus typically employ one of two methods for detecting the identity of a tuned-in radio station. One method, known as a "sniffer" method, involves tuning the receiver to the local radio phase lock loop (PLL) and then calculating the tuned frequency by knowing the intermediate frequency (IF). The second method, known as a "comparator" method, involves comparing output audio signals from the speaker port to a (known) reference audio signal (i.e., a pre-selected radio station). Then, if the two signals are in phase, the tuned radio station can be identified. Both methods, however, suffer from shortcomings.

The "sniffer" method's shortcomings include the fact that different radio manufacturers have different IF frequencies (i.e., there are no standards for IF frequencies), and that some radio manufacturers do not have local PLL for AM radio stations, which makes them impossible to measure. The comparator method's shortcomings include the fact that it takes too much time (i.e., typically ten seconds or more) to find the selected station—which is disadvantageous if the vehicle's occupants have subsequently changed stations again.

Another proposal has been advanced by a joint venture between Media Audit of Houston, Tex. and Ipsos of the U.K. Their approach uses Ipsos' so-called "smart phone" which records media exposure by tracking water-marked-encoded signals.

The details of Media Audit/Ipsos approach are not available but it is evident that Media Audit/Ipsos approach's greatest draw back is the huge capital investment needed for manufacturing special, "smart phones" and hardware at broadcast studios to encode signals. That approach has no listener interaction and no way to determine whether a radio or television source is merely being monitored or actually being listened to. Moreover the encoding approach is untested and believed to be unreliable today. The smart phone will also suffer from some of the same drawbacks present with the Arbitron PPM as encoded signals are used. That is conclusion from media reports of field testing of the Media Audit/Ipsos "smart phone" in the United Kingdom which were less than favorable.

In September 2006 Nielson Media Research, known for its dominance in the television ratings market, announced it will test its cell phone attached "go-meter" and plans to compete with Arbitron and Media Audit/Ipsos in the radio ratings market. The "go-meter" was originally designed to measure out-of-home television viewing.

One shortcoming of all other competing approaches to the invention, including the approach to television ratings used by Nielsen Media Research of New York, N.Y., and the Nielson "go-meter" is that they all require large capital investments for specially manufactured equipment, undoubtedly driving the cost of the needed listenership and viewership information beyond the reach of smaller radio and television broadcasters. Indeed, Arbitron has already announced its PPM will result in significantly more expensive market data costs to its customers. The invention, on the other hand, utilizes ordinary telephones, including ordinary, unmodified wireless cell phones and will result in significant cost reductions over the current and proposed methodologies and systems in use by Arbitron and all other known radio or television ratings services.

The market coverage for some competing approaches to the invention is limited to the geographic locations in which any required specially manufactured equipment has been deployed, especially if encoding equipment must be deployed at the radio or television station broadcast site. The telephone, including the wireless cell phone utilized with the invention is ubiquitous and used everywhere. Existing, prolific, nationwide wireless cell phone usage means rapid demographic outreach in any and all markets using the invention.

Moreover, the approaches that use encoding of signals in a particular market may not be able to truly obtain full market survey coverage in broadcast markets where, for example, clear channel, 50 KW am stations hundreds of miles away from listeners also service said particular market or in the case smaller broadcasters who may not be able to afford the encoding technology or choose not to utilize the particular encoding approach utilized by a ratings company.

Ordinary people will not routinely bring objects like the Arbitron PPM, which has no other useful purpose, with them when they leave their homes. On the other hand, in today's world, ordinary people (children and adults alike) bring ordinary, wireless cell phones everywhere, including to work, on vacation and even to the beach. These same unmodified wireless cell phones routinely now include Internet access, text messaging, emails, audio and video players, digital cameras, PDAs and more. The Nielsen Media Research system does not provide for capturing viewership data for television audiences outside their own homes. In our mobile society and with portable televisions, a segment of the market is totally missed.

The invention provides real time data unlike the Arbitron PPM which requires delivery of the information via the Internet if and when the PPM carrier takes the time to do it. On the other hand, the invention can provide listener and viewer reaction to specific on-air events or marketing campaigns that can be made available to advertisers and business concerns shortly after (or for longer duration broadcast events even during) the broadcast. The invention is capable of providing precise real time data collection which would allow for specific broadcast events, like the NFL Super Bowl to be monitored giving advertising and broadcast executives the ability to make advertising content decisions while on the air using near real time data from the invention.

As mentioned above, the said "sniffer" method's shortcomings include the fact that different radio manufacturers have different IF frequencies (i.e., there are no standards for IF frequencies), and that some radio manufacturers do not have local PLL for AM radio stations, which makes them impossible to measure. The comparator method's shortcomings include the fact that it takes too much time (i.e., typically ten seconds or more) to find the selected station—which is disadvantageous if the vehicle's occupants have subsequently changed stations again.

None of the other approaches can, as the invention does, determine whether the radio listener or television viewer is actually listening to or viewing the programming as opposed to merely hearing it. Moreover, some devices like the PPM may be placed near a radio or the Nielsen Media Research apparatus near a television set and left to record while no one is even in the room or at home.

Unlike the other approaches, the invention provides a reliable mechanism to determine and record duration of radio listener and television viewer attention to broadcasts, while the unattended PPM, or Nielsen Media Research apparatus, for example, give a distorted picture of listening or viewing and duration of listening or viewing depending upon the facts and circumstances. Unlike the other approaches, the invention functions in all cases with human interaction. The unattended PPM or Neilsen Media Research apparatus can give false measurements of true radio listening or television viewing, respectively, with no person being present.

Unlike the other approaches, the invention provides full analog and/or digital programming audio and computer data recording and storage available for future use and verification or for any other purposes at anytime, insuring accountability and transparency of the data and the data gathering process.

Unlike the other approaches such as the Arbitron PPM, the invention is not susceptible to signal corruption as are single-source encoded RF signals.

It is therefore an object of the invention to provide for the first time, accurate, verifiable, reliable and meaningful market survey data and information regarding radio listenership and television viewership preferences and habits, and demographics, acquired on a real time basis, to advertising agencies, advertisers, radio and television broadcast companies and others needing this kind of accurate and meaningful market data and other information.

It is another object of the invention to provide relevant market data to those who need and rely on this data on a much more affordable basis than is currently available or is proposed by others.

It is another object of the invention to eliminate the large capital expenditures involved with the designing and manufacture of specialized electronic devices, specially equipped or modified cell phones and the encoding and other equipment needed to be installed at broadcast facilities in order to utilize the other proposed, so-called "solutions."

It is another object of the invention to eliminate the waste of resources and time that will occur when competing encoding and other technologies vie to be the standard. No special technology is needed to obtain a better end product by using the invention.

It is another object of the invention to reduce the general business expenses and costs of a "radio or television ratings" company by eliminating most of manual labor and taking advantage of available computer technology and automation.

It is another object of the invention to increase dramatically the size of the data pool using mass calling and computer technology thereby making retrieved data and other information more meaningful and useful, statistically and otherwise. By utilizing ordinary telephones, including ordinary, ubiquitous wireless cell phones carried by most Americans over the age of 12, essentially everywhere they go; the universe of those participating in market surveys is increased very dramatically.

It is another object of the invention to increase dramatically the value of the data to end-users. By being able to identify not only whether someone is listening to a particular radio program or viewing a particular television program at a particular time, but also their age, gender, ethnicity, occupation, etc., the value of the data to end-users is magnified dramatically.

It is another object of the invention to allow for specialized or targeted market research studies, as data gathering, automated telephone calls can be directed to specific markets, age groups, genders, ethnic groups, occupation groups, etc.

It is another object of the invention to provide a service that would allow for advertising decisions to be made in a near real time dimension to allow decisions to be made by radio and television broadcasters and advertisers even while the affected programming is being aired.

SUMMARY OF THE INVENTION

In accordance with the present invention, there is provided an automated, interactive system, method and process designed for obtaining comprehensive, real-time radio listener and television viewer market survey data, demographic and other information utilizing ordinary telephones including wireless cell phones, hardwired touch tone phones and rotary phones.

Throughout this application we refer to "radio listeners" and "television viewers" or similar terminology. While it is obvious from the body of this application, that the invention gathers data from broadcast audio recordings it is worth noting that television "viewership" is determined by and from the audio portion of television programming and not the video portion. Radio and television broadcast signals are both, in a generic and technical sense, "radio signals" insofar as they are broadcast on the radio frequency spectrum. Indeed, many television signals and "fm radio" broadcast signals are located very close to each other on the very high frequency (VHF) radio bands. The same is true for satellite transmitted signals. Moreover, radio and television audio signals that are today received over different modes and apparatus, such as via the Internet or, from a "cable TV" or a "satellite TV" company are absolutely the same for the purposes of the invention and work with the invention, for all purposes of the invention.

All telephones, regardless of the service source, including voice over the Internet protocol (VoIP), are compatible and also work with the invention. One innovative aspect of the invention is the system's ability to use unmodified, over-the-counter, wireless cell phones which are ubiquitous, especially in the United States, and are carried everywhere, including by children.

The invention works with radio and television signals from any source including terrestrial RF, satellite RF, Internet and cable signals.

Using current and future telephony technology, large numbers of interactive, automated telephone calls, which will result in a statistically significant data pool, will be made to telephone users, including wireless cell phone users to determine, among other things, what radio or television broadcast station and programming each said telephone user is actually listening to or hearing at the time of each said call by, among other means, recording a segment of said radio or television program audio being listened to or heard with each said telephone user's telephone mouthpiece or microphone at the time of each said call.

Use of ordinary wireless cell phones will open new vistas, not only in measuring radio listenership and television viewership, but in any type of market research survey that can be conceived of covering consumer products to politics. The invention can perform any type of market research.

The operator of the invention can enter into mutually beneficial arrangements with telephone companies and carriers, especially wireless cell phone companies. For example, an arrangement could be reached with a wireless cell phone company under which its cell phone customers will be encouraged to enroll in radio-listening and television-viewing or other market research programs carried out by the operator of the invention in return for certain inducements described below. And, said arrangements with telephone customer-enrollees will satisfy Federal Trade Commission and other do-not-call-list requirements.

As inducements to participate, cell phone customers can receive "free minutes" or credits against their cell phone bills, either monthly or per call. Other promotional inducements, such as tickets to concerts and other prizes can be developed. These promotional items can also help the participating wireless cell phone companies market their core products and services. Moreover, such inducements need not be limited to wireless cell phone companies and users.

In full or partial payment or reimbursement to participating wireless cell phone companies for the "free minutes" or cell phone bill credits they give to their cell phone customer-enrollees, the operator of the invention can organize programs with radio and television broadcast organizations who purchase the operator's market research services to provide free or reduced cost advertising time to said participating wireless cell phone companies.

In turn, said participating radio and television broadcast organizations could receive payment or reimbursement for giving said participating wireless cell phone companies this free or reduced-cost advertising time in the form of a discount from the operator of the invention. Radio and television broadcast organizations who participate in said free or reduced-cost advertising arrangement can thereby benefit by having their listeners and viewers patronize participating wireless cell phone companies.

Said cell phone customer-enrollees can provide the invention operator, personal demographics, call time preferences and other information upon enrollment. The strength of the demographic information will be enhanced by requiring notification from the wireless cell phone company of reassigned numbers and by querying the each said cell phone-enrollee during the sign-up process if he or she is expected to be the only user of the particular cell phone/number assigned.

Therefore, to maximize the effectiveness of the survey process, a telephone owner may be pre-enrolled, as mentioned above, and provide key demographic and other information and waive applicable "do not call" regulations in advance of a call. A wireless cell phone or other telephone user could receive free minutes or other inducements and prizes to enroll. A database of this demographic and other information will be recorded, saved, labeled and identified electronically by each said telephone user's 10 digit telephone number or other unique identifier and stored and maintained indefinitely for possible use.

As explained herein below in greater detail, said demographic and other information may also be obtained during the same interactive, automated phone calls made to telephone users, as mentioned above, during which radio or television broadcast program audio being listened to or heard by each said telephone user is recorded. Said demographic and other data and information would be, in that instance, obtained by means of automatic, prerecorded questions posed to each said telephone user during said telephone calls with responses to said questions received and recorded using the telephone key pad or short voice responses by each said telephone user using current and future tone and voice recognition technologies to determine said responses. The demographic and other information obtained in this fashion will also be recorded, saved, labeled and identified electronically by each said telephone user's 10 digit telephone number or other unique identifier and stored and maintained indefinitely.

Upon receiving a call under this invention, the wireless cell phone or other telephone user called will hear a short recorded message, including instructions and a request that said telephone user point his or her telephone mouthpiece or microphone in the direction of, and close enough to, the audio source of the radio or television broadcast program audio he or she is then currently listening to or hearing so that a clear and undistorted recording as possible of said program audio may be made by the operator of the invention. Each said short recorded message to telephone users would also provide instructions regarding the duration of the recording (e.g., ten or fifteen seconds). An audible "beep" could be sent to the telephone user signaling the end of the recording. The operator of the invention will record, save, label and identify electronically each said audio recording by each said telephone user's 10 digit telephone number or other unique identifier and store and maintain each said audio recording indefinitely.

Depending upon the survey being conducted and/or the amount of demographic information already on file for the particular telephone user, automated, interactive questions and answers may also be posed to said telephone user during an automated, interactive telephone call, with each said telephone user responding to prerecorded questions by pushing appropriate keys on the telephone phone keypad, as directed. Instructions given to each telephone user called can include a initial request in different languages for the telephone user to designate a particular language be used during the session from a list of commonly used languages in the market being tested. Survey questions may include, for example: (1) "Are you actually paying attention to the content of the program we just recorded together, or are you just hearing it? Using your telephone keypad, press 1 if you are actually paying attention to this program or press 2 if you are not actually paying attention to it." (2) Will the duration of your listening to or hearing this program exceed 15 minutes? Using your telephone keypad, press 1 for yes or press 2 for no"? (3) How often do you tune in this program? Using your telephone keypad, press 1 for often, press 2 for occasionally or press 3 for rarely." Answers to prerecorded messages may also be obtained by means of verbal responses to said prerecorded questions and then the use of current and future voice recognition computer software to decipher and record answers given by telephone users in this manner.

Live streaming audio programming from each radio and television broadcast station broadcasting in the market being tested (i.e., the radio and television broadcast stations serving the geographical area of the particular telephone users who are called) also will be simultaneously, during calls to telephone users, monitored, recorded, saved, identified and labeled electronically by specific broadcast station of origin identifier, and date and time of broadcast. Said live, streaming audio may be received via the Internet, cable, reception of RF signals or by means of any other current or future available technology, and recorded on a date and time sensitive and labeled basis.

Current and future computer audio matching technology and software is then used by the operator of the invention to compare and match (A) each recorded radio and television broadcast audio segment received and recorded during automated, interactive telephone calls to each telephone user, as described above, to (B) the streaming programming audio recorded simultaneously during each said automated, interactive telephone call from all radio and television broadcast stations broadcasting in the particular market being tested. Upon each "audio match," the radio or television station of origin associated with the matched recorded radio and television broadcast audio segment received during automated, interactive telephone calls to each telephone user is determined, recorded, associated with said telephone user and saved indefinitely.

As discussed in further detail below, there currently exists a number of robust and reliable audio matching technologies that possess strong immunity to ambient background noise, distortion caused by over-driving or high volume inputs or otherwise and generally poor quality audio signals and possess the ability to achieve very high audio matching accuracy even with short (e.g., 5 to 10 second) audio samples picked up by, recorded and emanating from telephones, including wireless cell phones. "Audio matching" for the purposes of the invention may also include any suitable current or future technology including the detection of inaudible or subaudible signals embedded in radio and television broadcast signals.

In most cases, telephone recorded audio samples are to be audio matched against a relatively small number (e.g., 25 to 50) of contemporaneously received and recorded radio and television program audio streams from radio and television stations who broadcast in the market being tested. As described in more detail herein below, this audio matching technology will integrate with an automated, interactive, calling, recording, indexing, labeling and audio matching process which culminates in the creation of an alpha/numeric market research database in any current or future available database format including those currently on the shelves of computer software retailers across America and in use by the intended end-users of said market research data and information.

Audio matching can be accomplished with any number of existing computer software based technologies, including by comparison of analog, digitized or inaudible encoded signals embedded in or superimposed on radio and television broadcast signals. While not limited to any particular audio matching technology, the invention will use current technology to match audio signals. One such superior technology is owned by Audible Magic Corporation of Los Gatos, Calif. (Audible Magic). Audible Magic was founded in 1999 and provides content management and anti-piracy services to the media and entertainment industries, as well as governmental and educational institutions. The company's offerings utilize patented digital fingerprinting technologies and an extensive reference database of copyrighted content. Its digital technology is designed to monitor, track, manage, and in some cases filter copyrighted multimedia content in all of its forms, including radio and TV analog broadcasts, Internet and satellite streams, physical media files, as well as P2P and private network file transfers. The company's core copyright-sensing technology, CopySense, accurately identifies digital or broadcast media content based on the perceptual characteristics of the content itself. Built on a patented electronic fingerprinting process, the technology is robust, efficient, and massively scalable. The Audible Magic technology is fully adaptable for use with the invention.

As mentioned above, the invention may utilize any other current or future audio matching technology such as encoding broadcast signals or embedding said broadcast signals with inaudible fingerprints or other data or otherwise.

While not limited to any particular telephony technology, the invention will use current and future telephony technology to make large numbers of simultaneous, automated, interactive telephone calls, record audio segments of radio and television broadcast audio during said calls to telephone users and ask interactive questions and record answers during said calls. One such superior technology is owned or licensed and operated by CallPointe.com of Tucson, Ariz. which is a private vendor of ASP messaging services. CallPointe's automated call center uses state of the art telephony equipment and software designed to maximize the accuracy of the product's call process and detection. CallPointe's business methods and software allow CallPointe to correctly identify the calling target, deliver messages and receive and digitally record audio and other data with a high degree of accuracy from each telephone user. (Analog recordings may also be used with the invention). The digital recordings of radio and television audio segments from telephone users recorded by CallPointe or other call center that is utilized, will be transmitted to the operator of the invention for analysis and audio matching to simultaneously recorded streaming broadcast audio received and recorded from all or selected radio and television broadcast station sources in the telephone users' market using Audible Magic's or other similar technology, as mentioned above. The answers to automated prerecorded questions posed to telephone users will also be electronically transmitted to the operator of the invention which will add said data to its database created and maintained on each telephone user called. CallPointe sits on the Time Warner Fiber Loop and has virtually unlimited digital telephony capacity and the ability to bring on new capacity quickly. Currently, CallPointe has the capacity to place and record 66,240 calls per day. Its products scale easily and it has the manpower to bring new calling capacity to bear immediately to utilize the invention.

When an audio match is made, as described above, the invention operator's computer is programmed to take the resultant data and automatically populate an alpha/numeric market research database, creating or adding to individual records for each telephone user to which a completed call has been made, or prior contact has been made by the operator, including fields for the matched radio station's call sign (or other identifier), time and date of recording, the associated telephone user's 10 digit telephone number (including area code) and full demographic and other information on each said telephone user (obtained on enrollment or by automated, interactive questioning during a call, as described above) including age, gender, ethnicity, location, occupation and any other information desired. The data results of any interactive questions and answers will also be added to the data base from the data recorded by the automated, interactive telephone calling system.

The system makes available unprecedented real-time, accurate, verifiable data of true radio and television program listenership and viewership for radio and television broadcasters, advertisers and others who find this market data necessary or useful.

Because said recorded and audio-matched radio and television broadcast audio associated with each telephone user is saved in a database indefinitely, the system allows for accurate audit and review of the invention's data retrieval results either routinely or in the event of a dispute by users. Audits can occur randomly, routinely or in response to an inquiry by users. For further utilization, this alpha/numeric market data will be stored electronically and would be available for more in-depth analysis. Thereby, trends and anomalies can be detected and analyzed routinely and quickly.

Because the invention calls for making a direct, human listener or viewer-assisted recording of actual listening and viewing, as opposed to human memory paper logs or by merely counting encoded signals from RF sniffing or other non-audio based listening devices (that can simply be placed near a radio or television set playing a set channel with no confirmation of actual listening), only data obtained by the invention is suitably accurate, verifiable and audit proof.

The invention allows for distinguishing between listening and hearing radio and television program broadcasts by querying enrollees specifically on that issue. Also, on a less reliable, albeit still useful basis, the listening vs. hearing issue can be predicted by rating signals based on the amount and types of ambient noise associated with the telephone reception when it is recorded.

The invention also eliminates the human error and statistical bias that is present when a relatively small group of individuals is relied upon to submit historical handwritten paper logs or to wear an otherwise useless device to meter radio signals, such as Arbitron's PPM.

The invention is not burdened with the security issue associated with a system that simply monitors and counts received encoded RF signals, such as the Nielson system or Arbitron's PPM since the technology to compromise such a system and manipulate that sample data already exists.

Most importantly to the advertising, television and radio industries, the invention's ratings process will be totally transparent. There will be no surprise ratings due to time delays, unforeseen market changes and questionable data collection methods. Remarkably, in today's "information age," Arbitron's ratings data is still disseminated quarterly.

Because all of the alpha/numeric market data is immediately stored electronically, more in-depth, faster analysis will be available to users over the Internet. Any number of "off the shelf" data base software programs can be utilized to analyze and send data to customers in readily used formats. Trends and anomalies can be detected and analyzed routinely and very quickly. Advertisers may even determine during actual broadcasts of programming whether to modify or pull advertisements based on saturation and demographics obtained on a real-time or near real-time basis.

The present invention meets the identified and heretofore unmet needs of the radio and television and advertising industries by providing a system and method for obtaining, monitoring, recording and reporting comprehensive, reliable, real-time, verifiable radio listener and television viewer statistics and other data.

BRIEF DESCRIPTION OF THE DRAWING

A complete understanding of the present invention may be obtained by reference to the accompanying drawing, (FIG. 1) when considered in conjunction with the subsequent, detailed description, in which:

FIG. 1 is a block-drawing, schematic view of an automated, radio and television data collection and market research system using (i) ordinary, unmodified telephones, including wireless cell phones and hardwired, touch tone and rotary telephones (collectively "telephones") to gather radio listener and television viewer program preferences, demographic and other data and information and (ii) current and future technology, including computer, software, audio matching, tone frequency identification, audible and subaudible signal detection and encoding, voice recognition, database software and Internet technologies to provide real time, accurate, statistically significant and verifiable market research data and other information for the radio and television broadcast and advertising industries and other interested parties in any selected market, whether national in scope or local.

For purposes of clarity and brevity, like elements and components will bear the same designations and numbering throughout the FIGURES.

DESCRIPTION OF THE PREFERRED EMBODIMENT

FIG. 1 is a block-drawing, schematic view of an automated radio and television ("radio/television") data collection and market research system using (i) telephones, including wireless cell phones and hardwired, touch tone and rotary telephones (collectively each a "telephone 1") to gather radio listener and television viewer program preferences, demographic and other information and data and (ii) current and future computer, software, audio matching, tone frequency identification, audible and subaudible signal detection and encoding, voice recognition, database 16 software and Internet technology to provide real time, accurate, statistically significant and verifiable market research and other data and information for the radio and television broadcast and advertising industries and any other data end-users 17. The invention works today with current technology.

1. The system is designed to gather data on radio/television listener and viewer preferences and habits, listening and viewing times and durations, demographic and other information and data from a statistically significant number of radio/television listeners and viewers who are also telephone 1 users by means of an automated, computer-generated interactive telephone 1 system operated by a call center 9 which initiates automated, computer-generated, interactive telephone 1 calls through wireless and other telephone 1 carriers and telephone companies 8 to said radio listeners and television viewers who are also telephone 1 users. By "automated" we mean a computer generates each telephone call and executes all aspects of each call without the assistance of a human being.

During each said automated computer-generated, interactive telephone 1 call to a telephone 1 user, the call center 9 will:

(a) receive and record telephone transmissions 7 carrying a segment of any radio/television broadcast audio 5 then being listened to or heard by each said telephone 1 user by means of directing each said radio/telephone 1 user in a prerecorded instruction to point the microphone 3 of his or her telephone 1 in the direction of any radio/television set 4 or other radio/television broadcast audio 5 source in said telephone 1 user's environment, regardless of the telephone 1 user's location (e.g., at home, at work, in the car, on the beach, etc.) in order to capture said radio/television broadcast audio 5 for transmission to, receiving and recording by said call center 9, and (b) receive and record telephone transmissions 7 carrying other information and data, including the specific radio/television program signal tuned-in by the radio/television set 6 each said telephone 1 user is then listening to or viewing, preferred listening and viewing times and durations, demographic and other information and data regarding each said telephone 1 user by means of posing computer-generated, interactive questions to each said telephone 1 user and receiving and recording the responses thereto by each said telephone 1 user, as follows: Said call center 9 will give each said telephone 1 user during each said call, prerecorded instructions and questions with a request that each said telephone 1 user communicate his or her answer to each said prerecorded question by (a) pressing a designated key or keys on the keypad 2 of said telephone 1 user's telephone 1 immediately after each said prerecorded question is posed or, (b) in the alternative, or in addition thereto, by each said telephone 1 user giving a short verbal response, such as "yes" or "no" or a particular number to answer a multiple choice question or any other pertinent word or phrase, verbal response immediately after each said prerecorded question is posed, into said user's telephone 1 microphone 3. The automated, computer-generated interactive telephone 1 system, hardware and software utilized by said call center 9 will use current and future state-of-the-art tone and voice recognition software to determine, record and relate to each said specific telephone 1 user the answers given by each said specific telephone 1 user to each said prerecorded questions.

2. The recorded audio segments and data 15 received, recorded and associated with each said telephone 1 user by the call center 9 during successfully completed calls, including (i) the recorded radio/television broadcast audio 5 segment that each said telephone 1 user was listening to or hearing during his or her completed call, as described in Subsection 1 (a), above, (ii) each said telephone 1 user's 10 digit telephone 1 number, (iii) each said telephone 1 user's demographic, listening and viewing preferences and other data and information given by each said telephone 1 user in response to the automated, computer-generated, prerecorded questions posed by the call center 9 during said completed calls, as described in Subsection 1 (b), above, and (iv) the date and time of day of each said completed call to each said telephone 1 user is transmitted to the computer control center 10 via any current or future available electronic means (e.g., hard wire, Internet, magnetic media, telephone 1, etc.).

3. It is noted that while very few rotary telephones (which do not use touch tone technology) are in service today in the United States, the system can work with rotary telephones 1 by providing the option of using only verbal responses to automated, computer-generated, prerecorded questions posed by the call center 9 and thereby rely on current and future voice recognition software technology to determine the verbal responses to said automated, computer-generated, prerecorded questions.

4. It is also noted that not every completed call by the call center 9 to a telephone 1 user will result in a usable recorded audio segment and data 15 sample as the call center 9 will not know (even if it has each telephone 1 user's listening and viewing time preferences in its database prior to a call) whether a telephone 1 user is actually listening to or hearing any radio/television broadcast audio 5 at the time of a call from the call center 9 or whether such telephone 1 user's telephone 1 equipment or radio/television set 4 or other radio/television broadcast audio 5 source is of sufficient quality to be successfully recorded, or whether there is too much ambient, interfering noise in said telephone 1 user's immediate environment to interfere with the making of a successful recording.

5. It is also noted that the system is designed to make a large volume of calls from the call center 9 which will result in statistically significant "positive hits" or responses from telephone 1 users who provide usable, recorded audio segments and data 15. The number of calls the call center 9 may make to telephone 1 users is limited only by the amount of telephony equipment employed by said call center 9 and said call center's access to telephone 1 carrier networks such as the Time Warner Fiber Loop which has virtually unlimited digital telephony capacity allowing for hundreds of thousands, even millions of calls a day.

6. The system utilizes audio matching technology to identify, verify and confirm the source, date and time of the radio/television broadcast audio 5 segments received and recorded by the call center 9 from telephone 1 users, as described in sections 1 and 2, above, as follows: At the same time said telephone 1 calls are being made to telephone 1 users by said call center 9 and said telephone 1 users' radio/television broadcast audio 5 segments are being recorded by said call center 9, as described in Sections 1 and 2, above, the computer control center 10 receiver 11 simultaneously and on a real time basis receives and monitors the radio/television streaming program audio 14 carried by radio/television signals 13, with each said signal of known broadcast station origin, emanating from all or a select number of radio/television stations 12 serving said telephone 1 users' listening and viewing market (i.e., radio/television stations 12 whose programs are available for listening or viewing by said telephone 1 users within said telephone 1 users' geographical location, area or region).

7. The radio/television streaming program audio 14 received by the receiver 11 in the process of monitoring said radio/television stations 12 is transmitted to the computer control center 10 electronically via any current or future available technology and means (e.g., hard wire, Internet, magnetic media, telephone 1, etc.).

8. Said real time, streaming radio/television signals 13 received by the receiver 11 may emanate from any current or future source of radio/television programming available, including from RF signals transmitted from terrestrial or space based antennas, and via the Internet and cable systems.

9. While the schematic in FIG. 1. shows a "receiver 11," it may, in some cases, be a conceptual receiver 11 in that independent, for profit, businesses currently make available for a fee real time streaming radio/television streaming program audio 14, or recorded and date and time-clocked radio/television streaming program audio 14, from radio/television signals 13 in various radio/television broadcast markets and that, or any other source of streaming radio/television program audio 14 in any given market, may be used and inputted to the computer control center 10 via any available electronic means (e.g., hard wire, Internet, telephone 1, etc.).

10. It is also noted that the radio/television market of telephone 1 users may be of any size and geographical location, including national and regional markets.

11. The computer control center 10 records and "clocks" (i.e., electronically date and time stamps) the real time incoming radio/television streaming program audio 14 from the radio/television signals 13 of known origin which are transmitted to said computer control center 10 by the receiver 11. As stated in section 2, above, the radio/television broadcast audio 5 segment received from each telephone 1 user and recorded by the call center 9 and transmitted to the computer control center 10 is also date and time-stamped with the date and time each said recording was made.

12. The computer control center 10 will use current and future computer audio matching technology, including that which matches audio by comparing by computer various characteristics of analog and digital audio signals or by decoding inaudible or subaudible signals imbedded in broadcast audio by radio and television broadcasters in order to compare:

(a) the radio/television streaming program audio 14 from the radio/television signals 13, each of known broadcast station origin, date and time and received by the receiver 11, as described in Sections 6 to 9, to (b) the radio/television broadcast audio 5 segments received and recorded by the call center 9 from telephone 1 users, as described in Sections 1 and 2, above in order to identify and match identical segments of recorded radio/television broadcast program audio emanating from each source in Subsections (a) and (b), above, and aired by the same radio/television station 12 on the same date and time. The principal purpose of said audio matching is to determine and confirm the identity of the radio/television station of origin and date and time of broadcast of each said radio/television broadcast audio 5 segment received and recorded by the call center 9 from each telephone 1 user, as described in Sections 1 and 2, above.

13. Because the radio/television streaming program audio 14 received by the receiver 11 comprises streaming program audio segments, each of known date, time and origin from the radio/television stations 12, upon each said audio match, described in Section 12, immediately above, the computer control center 10 then has the needed data to determine and associate the specific radio/television station of origin included in the radio/television stations 12 monitored, and the programming date and time to each matched radio/television broadcast audio 5 segment received and recorded by the call center 9 from each said telephone 1 user. As an option, when combined with each of said radio/television stations' 12 programming schedules, the computer control center 10, will also have the data needed to also determine the exact programming each telephone 1 user was listening to or hearing at the time of a call from the call center 9.

14. Because upon each said audio match, described in Section 12, above, the specific radio/television station of origin, date and time of each said radio/television broadcast audio 5 segment recorded by each telephone 1 user during a call from the call center 9 is then determined and confirmed, and upon receiving the recorded audio segments and data 15 from the call center 9, the computer control center 10 then has the information and data necessary to and does automatically create and populate a database 16 with a record for each specific telephone 1 user whose recorded audio segment was so matched. Said database 16 record includes fields for, among other things, each said telephone 1 user's 10 digit telephone 1 number, the call sign or other identifier of the specific radio/television station of origin whose radio/television broadcast audio 5 segment was listened to or heard and recorded by said telephone 1 user during said telephone call from the call center 9, the date and time said radio/television broadcast audio 5 segment was recorded by said telephone 1 user, the radio/television listening and viewing preferences and habits, demographic information, including ethnicity, age, gender, occupation, etc., and other information including listening and viewing duration information, provided by said telephone 1 user in answering automated, prerecorded questions as described in Section 1, above, or during a pre-call enrollment process, as described in Subsection 18 (d), below.

15. Said computer control center 10 will use existing and future software technology to accomplish said automated database 16 creation process. Under current software technology and program code-writing techniques, the data regarding each said identified telephone 1 user would be expressed by a unique identifier number for each said identified telephone 1 user. The associated data for the date and time of recording of the radio/television broadcast audio 5 segment, the radio/television station of origin identifier, the market, and the telephone 1 users' demographics such as ethnicity and age, etc., would also be converted to number code.

16. The resultant database 16 records and fields described in Sections 14 and 15, immediately above, would be put into any database format requested by or desirable by data end users 17 or in any other format readable by any current or future database 16 software program for universal reading, analysis and use of the data, especially for data end-users 17 such as large and small radio and television broadcast organizations, advertisers and advertising agencies.

17. Data contained in the database 16 generated by the computer control center 10 can be transmitted to said data end-users 17 on a real time basis via Internet or other means of data transmission 18 including any available current of future means of electronic data transmission. On a less timely basis such data could be sent to end-users 17 via recordable media (e.g., by CD, tape, disk or memory chip media), e-mail, and printed hard copies via fax, the U.S. Postal Service or by private courier delivery.

18. The system also provides a:
   (a) Means to determine duration of listening or hearing by telephone 1 users to radio/television broadcast audio 5 (a) by means of timed, follow up recalls to said telephone 1 users who are listeners and viewers, giving automated, prerecorded instructions to repeat the same audio recording process described in section 2, above, but with different instructions and questions to determine whether said listeners and viewers are then still listening or hearing the same radio/television broadcast audio 5 audio that was recorded during the immediately preceding completed call to said listeners and viewers or (b) by means of recording answers to automated, prerecorded questions during the initial or follow-up call on the issue of duration and other issues, as desired, given by said telephone 1 users by depressing designated keys on the keypads of said telephones, as instructed during said initial or follow up call to said telephone 1 user or by recording verbal responses by said listeners and viewers to said questions using the same process and means described in section 2, above;
   (b) Means to analyze data and report said data to advertisers, advertising agencies, radio and television broadcast companies and stations and other data end-users 17, data on radio/television listener and viewer listening behavior, station and programming preferences and demographic information regarding said listeners and viewers on a real time basis.
   (c) Means to provide inducements to participating telephone 1 users, especially wireless cell telephone 1 users who are generally billed by minutes actually used in the form of "free minutes" or credits against said telephone 1 users' telephone 1 bills and other promotional inducements, such as tickets to concerts and other prizes from participating wireless cell telephone carriers and other telephone companies 8.
   (d) Means to enroll participating telephone 1 users in said inducement programs, obtain "do-not-call" government regulation waivers and obtain demographic and other data and information from said telephone 1 users prior to any call by the call center 9.
   (e) Means to provide in full or partial payment for said "free minutes" and credits given to participating telephone 1 users by participating phone companies 8, free or reduced-cost advertising time on participating radio/television stations 12 to said telephone companies 8.
   (f) Means to provide participating radio/television stations full or partial payment for said free or reduced-cost advertising time to said telephone companies 8 in the form of a discount from the operator of the invention to said participating radio/television stations 12 in connection with market survey data purchased by said participating radio/television stations 12 from the invention operator.

19. Since other modifications and changes may vary to fit particular operating requirements and environments, it should be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

The embodiments of the invention in witch an exclusive property or privilege is claimed are defined as follows:

1. A method to obtain from radio listeners and television viewers on a real time, accurate and verifiable basis said radio listeners' and television viewers' radio and television listening and viewing habits and preferences, survey data, and demographic and other listener and viewer derived information, the method comprising the following steps:

(a) making individual computer-automated interactive telephone calls to each of said radio listeners and television viewers;

(b) (A) receiving and recording radio and television broadcast audio segments then being listened to or heard by and (B) posing computer-automated prerecorded questions to and receiving and recording answers thereto from each said radio listener and television viewer during a completed computer-automated interactive telephone call, rendering a completed telephone call;

(c) giving, during each said completed computer-automated interactive telephone call, prerecorded information and instructions for each said radio and television listener and viewer to point the mouthpiece, that is, the microphone portion, of his or her telephone in the direction of the source of any radio and television broadcast program audio then being heard or listened to by said radio listener and television viewer;

(d) receiving and recording, during each said completed computer-automated interactive telephone call, a segment of said radio and television broadcast program audio then being heard or listened to by each said radio listener and television viewer, using said mouthpiece of each said radio listener's and television viewer's telephone to capture each said segment of radio and television broadcast program audio, and transmitting said segment to the call center that made said computer-automated interactive telephone calls over wireless or wired telephone transmission systems and networks utilized to make said computer-automated interactive telephone calls;

(e) recording answers to each of said computer-automated prerecorded questions posed to each said radio listener and television viewer during each said completed telephone call (A) by each said radio listener and television viewer depressing one or more designated keys on a keypad of each said radio listener's and television viewer's telephone to give said answers, or (B) by recording verbal responses made by each said radio listener and television viewer to said automated recorded questions into each said radio listener's and television viewer's telephone mouthpiece to give said answers, as directed and instructed in said computer-automated prerecorded information and instructions given to each said radio listener and television viewer during each said completed telephone call;

(f) monitoring, receiving, recording and saving, on a real time basis, and identifying by each radio and television station of origin, date and time, streaming radio and television broadcast program audio emanating from each of the radio and television broadcast stations operating in one or more radio or television broadcast markets of said radio listeners and television viewers, and emanating from sources of said radio and television broadcast program audio available to said radio listeners and television viewers, including from RF signals received over the airwaves transmitted from terrestrial and space-based antennas, and transmissions over the Internet and cable systems;

(g) matching each segment of radio and television broadcast program audio received and recorded during completed telephone calls to radio listeners and television viewers, as described in subsection 1(d), above, to its identical counterpart within said streaming radio and television broadcast program audio emanating from each of the radio and television broadcast stations operating in said radio listeners' and television viewers' radio and said one or more one or more television broadcast markets, by computer, using computer audio matching technology, including technologies that decode inaudible or subaudible signals imbedded in said radio and television broadcast program audio, rendering an audio match;

(h) identifying and confirming the radio and television station of origin and date and time of broadcast of said radio and television broadcast program audio segments recorded during each said completed telephone call to each said radio listener and television viewer by comparing and matching by computer, using the computer audio matching technology as described in subsection 1(g) above:

(A) each radio and television broadcast program audio segment received and recorded during each said completed telephone call to each said radio listener and television viewer as described in subsection 1(d) above to; and (B) the streaming radio and television broadcast program audio emanating from each of the radio and television broadcast stations in said radio and television listener's and viewer's radio and said one or more television broadcast market that is received and recorded, as described in subsection 1(f) above, at the same time as the radio and television broadcast program audio segments from each said completed telephone call to each said radio listener and television viewer to be compared are received and recorded, as described in subsection 1(d), above;

(i) determining duration of listening or hearing of radio and television station broadcast program audio by said radio listeners and television viewers:

(A) by timed recalls to said radio listeners and television viewers after the completed telephone call, giving automated prerecorded instructions to repeat the audio recording process described in subsection 1(d), above, to determine whether said radio listeners and television viewers are then still listening or hearing the same radio or television broadcast station and programming audio that was recorded during the immediately preceding completed call, or (B) by recording answers to computer-automated prerecorded questions on the issue of said duration given by said radio listeners and television viewers posed either in the completed telephone call or a recall, as described in subsection 1(i)(A) immediately above, by depressing designated keys on the keypads of said telephones, as instructed during said telephone calls, or by recording verbal responses given by said radio listeners and television viewers to said questions as described in subsection 1(e), above;

(j) determining the identity of each said radio or television broadcast station, and the radio and television programming listened to or heard and recorded over the telephone by said radio listeners and television viewers during each said computer-automated interactive telephone call;

(k) determining the date and time said radio or television broadcast station programming is listened to or heard and recorded over the telephone by said radio listeners and television viewers;

(l) upon the audio match as described in subsections 1(g) and 1(h), above, automatically populating a computer database with records that include fields for (i) the identity of each said radio listener and television viewer, (ii) each said radio listener's and television viewer's ten digit telephone number, (iii) the specific radio and television broadcast station, by call sign, and source of program audio listened to, heard and recorded, as described in subsection 1(d) above, by each said radio listener and television viewer during each said computer-automated interactive telephone call, (iv) the date, time and duration each said radio listener and television viewer listened to or heard each said radio and television broadcast program audio segment received and recorded as described in subsection 1(d), above, (v) demographic and other listener and viewer derived information, including each said radio listener's and television viewer's age, gender, ethnicity, occupation, market and geographic location, and (vi) additional data and information obtained and recorded by means of said computer-automated prerecorded questions and answers during each said computer-automated interactive telephone call to each said radio listener and television viewer, as described in subsection 1(e) above, or alternatively in the event said radio listener or television viewer is pre-enrolled by his or her telephone company or carrier as part of a promotion or inducement for said radio listener and television viewer to accept said computer-automated interactive telephone calls from the operator of the invention and said additional data and information is given at that time;

(m) capturing, analyzing and delivering to advertisers, advertising agencies, radio and television broadcast companies, data and information on radio listener and television viewer listening and viewing behavior and habits, radio and television station and programming preferences, demographic and other listener and viewer derived information, on a real time basis in electronic format, software format, or by other delivery methods, including by facsimile, the Internet, email, US Postal Service and private or commercial couriers;

(n) rating competing radio and television broadcast stations and programming based on comparative listenership and viewership levels in a radio and television market, based on the data and information gathered by steps 1(a)-1(m);

wherein the above steps are for the purposes of gathering and recording on a real time basis, analyzing and disseminating accurate, comprehensive, verifiable, market survey data and other information from radio listeners and television viewers regarding said radio listeners' and television viewers' radio and television broadcast station and programming preferences, listening and viewing habits and attitudes, demographics and other listener and viewer derived information, collectively market survey data, utilizing ordinary telephones, including wireless cell phones, to receive and record said market survey data, including radio and television broadcast program audio segments actually being listened to or heard by each said radio listener, and radio listener and television viewer answers to automated prerecorded questions utilizing computer automated interactive telephony, audio matching, tone frequency identification, audible and subaudible signal detection, voice recognition, computer software and database functionality, and providing radio and television broadcast companies, and advertisers with statistically significant, timely, accurate and useful market survey data necessary or useful for making programming and advertising decisions by said radio and television broadcast companies, and advertisers.

2. The method of claim 1, further comprising auditing and reviewing for accuracy (1) the recorded and saved radio and television broadcast program audio segments recorded during each said completed telephone call to each said radio listener and television viewer; and (2) the matched segments of said streaming radio and television broadcast program audio emanating from the radio and television broadcast stations in said radio listener's and television viewer's radio and television broadcast market.

3. The method of claim 1, wherein the computer database is an alpha/numeric market database, created and populated with radio listener and television viewer preferences and said demographic data in real time as the preferences and demographic data are received, which data can be stored and formatted in a database computer program.

4. The method of claim 3, wherein the computer, alpha/numeric market data base is for the purposes of rating the relative listenership and viewership of radio and television broadcast programming in a particular market or markets and detecting and analyzing trends and anomalies, giving advertisers the ability to determine, during the actual radio and television broadcast of programming, whether to modify or pull advertisements based on saturation, demographics or other listener and viewer derived information thereby obtained.

5. The method of claim 1, further comprising generating survey data that is statistically significant from the completed telephone calls.

6. The method of claim 5, further comprising gathering and making available on an accurate, verifiable, real time basis data and information regarding whether the surveyed radio listeners and television viewers are actually listening to and paying attention to or merely hearing the radio and television broadcast program audio that their radio or television set is tuned to and receiving.

7. A system to obtain from radio listeners and television viewers on a real time, accurate and verifiable basis said radio listeners' and television viewers' radio and television listening and viewing habits and preferences, survey data, and demographic and other listener and viewer derived information, the system comprising:
  a telephone, a broadcasting device, and at least one computing device for performing the following operations:
    (a) making individual computer-automated interactive telephone calls to each of said radio listeners and television viewers;
    (b) (A) receiving and recording radio and television broadcast audio segments then being listened to or heard by and (B) posing computer-automated prerecorded questions to and receiving and recording answers thereto from each said radio listener and television viewer during a completed computer-automated interactive telephone call, rendering a completed telephone call;
    (c) giving, during each said completed computer-automated interactive telephone call, prerecorded information and instructions for each said radio and television listener and viewer to point the mouthpiece, that is, the microphone portion of his or her telephone in the direction of the source of any radio and television broadcast program audio then being heard or listened to by said radio listener and television viewer;
    (d) receiving and recording, during each said completed computer-automated interactive telephone call, a segment of said radio and television broadcast program audio then being heard or listened to by each said radio listener and television viewer, using said mouthpiece of each said radio listener's and television viewer's telephone to capture each said segment of radio and television broadcast program audio, and transmitting said segment to the call center that made said computer-automated interactive telephone calls over wireless or wired telephone transmission systems and networks utilized to make said computer-automated interactive telephone calls;

(e) recording answers to each of said computer-automated prerecorded questions posed to each said radio listener and television viewer during each said completed telephone call (A) by each said radio listener and television viewer depressing one or more designated keys on a keypad of each said radio listener's and television viewer's telephone to give said answers, or (B) by recording verbal responses made by each said radio listener and television viewer to said automated recorded questions into each said radio listener's and television viewer's telephone mouthpiece to give said answers, as directed and instructed in said computer-automated prerecorded information and instructions given to each said radio listener and television viewer during each said completed telephone call;

(f) monitoring, receiving, recording and saving, on a real time basis, and identifying by each radio and television station of origin, date and time, streaming radio and television broadcast program audio emanating from each of the radio and television broadcast stations operating in one or more radio or television broadcast markets of said radio listeners and television viewers, and emanating from sources of said radio and television broadcast program audio available to said radio listeners and television viewers, including from RF signals received over the airwaves transmitted from terrestrial and space-based antennas, and transmissions over the Internet and cable systems;

(g) matching each segment of radio and television broadcast program audio received and recorded during completed telephone calls to radio listeners and television viewers, as described in subsection 9(d), above, to its identical counterpart within said streaming radio and television broadcast program audio emanating from each of the radio and television broadcast stations operating in said radio listeners' and television viewers' radio and said one or more one or more television broadcast markets, by computer, using computer audio matching technology, including technologies that decode inaudible or subaudible signals imbedded in said radio and television broadcast program audio, rendering an audio match;

(h) identifying and confirming the radio and television station of origin and date and time of broadcast of said radio and television broadcast program audio segments recorded during each said completed telephone call to each said radio listener and television viewer by comparing and matching by computer, using the computer audio matching technology as described in subsection 9(g) above:

(A) each radio and television broadcast program audio segment received and recorded during each said completed telephone call to each said radio listener and television viewer as described in subsection 9(d) above to; and (B) the streaming radio and television broadcast program audio emanating from each of the radio and television broadcast stations in said radio and television listener's and viewer's radio and said one or more television broadcast markets that is received and recorded, as described in subsection 9(f) above, at the same time as the radio and television broadcast program audio segments from each said completed telephone call to each said radio listener and television viewer to be compared are received and recorded, as described in subsection 9(d), above;

(i) determining duration of listening or hearing of radio and television station broadcast program audio by said radio listeners and television viewers:

(A) by timed recalls to said radio listeners and television viewers after the completed telephone call, giving automated prerecorded instructions to repeat the audio recording process described in subsection 9(d), above, to determine whether said radio listeners and television viewers are then still listening or hearing the same radio or television broadcast station and programming audio that was recorded during the immediately preceding completed call, or (B) by recording answers to computer-automated prerecorded questions on the issue of said duration given by said radio listeners and television viewers posed either in the completed telephone call or a recall, as described in subsection 9(i)(A) immediately above, by depressing designated keys on the keypads of said telephones, as instructed during said telephone calls, or by recording verbal responses given by said radio listeners and television viewers to said questions as described in subsection 9(e), above;

(j) determining the identity of each said radio or television broadcast station, and the radio and television programming listened to or heard and recorded over the telephone by said radio listeners and television viewers during each said computer-automated interactive telephone call;

(k) determining the date and time said radio or television broadcast station programming is listened to or heard and recorded over the telephone by said radio listeners and television viewers;

(l) upon the audio match as described in subsections 9(g) and 9(h), above, automatically populating a computer database with records that include fields for (i) the identity of each said radio listener and television viewer, (ii) each said radio listener's and television viewer's ten digit telephone number, (iii) the specific radio and television broadcast station, by call sign, and source of program audio listened to, heard and recorded, as described in subsection 9(d) above, by each said radio listener and television viewer during each said computer-automated interactive telephone call, (iv) the date, time and duration each said radio listener and television viewer listened to or heard each said radio and television broadcast program audio segment received and recorded as described in subsection 9(d), above, (v) demographic and other listener and viewer derived information, including each said radio listener's and television viewer's age, gender, ethnicity, occupation, market and geographic location, and (vi) additional data and information obtained and recorded by means of said computer-automated prerecorded questions and answers during each said computer-automated interactive telephone call to each said radio listener and television viewer, as described in subsection 9(*e*) above, or alternatively in the event said radio listener or television viewer is pre-enrolled by his or her telephone company or carrier as part of a promotion or inducement for said radio listener and television viewer to accept said computer-automated interactive telephone calls from the operator of the invention and said additional data and information is given at that time;

(m) capturing, analyzing and delivering to advertisers, advertising agencies, radio and television broadcast companies, data and information on radio listener and television viewer listening and viewing behavior and habits, radio and television station and programming preferences, demographic and other listener and viewer derived information, on a real time basis in electronic format, software format, or by other delivery methods, including by facsimile, the Internet, email, US Postal Service and private or commercial couriers;

(n) rating competing radio and television broadcast stations and programming based on comparative listenership and viewership levels in a radio and television market, based on the data and information gathered by operations 9(*a*)-9(*m*);

wherein the above operations are for the purposes of gathering and recording on a real time basis, analyzing and disseminating accurate, comprehensive, verifiable, market survey data and other information from radio listeners and television viewers regarding said radio listeners' and television viewers' radio and television broadcast station and programming preferences, listening and viewing habits and attitudes, demographics and other listener and viewer derived information, collectively market survey data, utilizing ordinary telephones, including wireless cell phones, to receive and record said market survey data, including radio and television broadcast program audio segments actually being listened to or heard by each said radio listener, and radio listener and television viewer answers to automated prerecorded questions utilizing computer automated interactive telephony, audio matching, tone frequency identification, audible and subaudible signal detection, voice recognition, computer software and database functionality, and providing radio and television broadcast companies, and advertisers with statistically significant, timely, accurate and useful market survey data necessary or useful for making programming and advertising decisions by said radio and television broadcast companies, and advertisers.

* * * * *